United States Patent
Goda et al.

(10) Patent No.: US 6,202,271 B1
(45) Date of Patent: Mar. 20, 2001

(54) METHOD AND APPARATUS FOR MANUFACTURING EXPANDED MESH SHEET AND BATTERY USING THIS EXPANDED MESH SHEET

(75) Inventors: Yoshio Goda, Yao; Masahiko Ogawa, Takarazuka; Hiroyuki Kobayashi, Yawata; Saburo Nakatsuka, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,779

(22) Filed: Mar. 2, 1999

(30) Foreign Application Priority Data

Mar. 13, 1998 (JP) ................................. 10-062662
Mar. 13, 1998 (JP) ................................. 10-062663

(51) Int. Cl.⁷ ............................ B21D 31/02; B21D 31/04
(52) U.S. Cl. ................................. 29/6.2; 29/6.1; 29/2
(58) Field of Search ......................... 29/2, 6.1, 6.2

(56) References Cited

U.S. PATENT DOCUMENTS

| | | | |
|---|---|---|---|
| 1,504,629 | * 8/1924 | Lentz | 29/6.2 |
| 1,578,365 | * 3/1926 | Redding et al. | 29/6.1 |
| 1,917,630 | * 7/1933 | Baker | 29/6.2 |
| 2,104,249 | * 1/1938 | Vass | 29/6.2 |
| 2,290,486 | * 7/1942 | Ballard et al. | 29/6.1 |
| 2,537,764 | * 1/1951 | Hunzicker et al. | 29/6.2 |
| 2,692,019 | * 10/1954 | Zalkind | 29/6.1 |
| 3,026,968 | * 3/1962 | Koskinen | 29/6.1 |
| 3,218,689 | * 11/1965 | Mumma | 29/6.2 |
| 3,351,995 | * 11/1967 | Johnson | 29/6.1 |
| 3,774,274 | * 11/1973 | Jury | 29/6.1 |
| 3,840,952 | * 10/1974 | North | 29/6.2 |
| 3,853,626 | * 12/1974 | Daniels, Jr. et al. | 136/36 |
| 3,867,200 | * 2/1975 | Daniels, Jr. et al. | 136/36 |
| 3,890,160 | * 6/1975 | Daniels, Jr. et al. | 136/36 |
| 3,893,214 | * 7/1975 | Parkinson | 29/6.2 |
| 3,913,193 | * 10/1975 | Borello | 29/6.2 |
| 3,945,097 | * 3/1976 | Daniels, Jr. et al. | 29/2 |
| 3,965,550 | * 6/1976 | Parkinson | 29/6.2 |
| 4,124,925 | * 11/1978 | Barnett | 29/6.2 |
| 4,221,032 | * 9/1980 | Cousino et al. | 29/2 |
| 4,247,970 | * 2/1981 | Bollinger | 29/2 |
| 4,291,443 | * 9/1981 | Laurie et al. | 29/6.1 |
| 4,303,747 | * 12/1981 | Bender | 429/161 |
| 4,315,356 | * 2/1982 | Laurie et al. | 29/6.1 |
| 4,345,452 | * 8/1982 | Eberle | 72/452 |
| 4,534,091 | * 8/1985 | Kline | 29/2 |
| 5,093,971 | * 3/1992 | Hein | 29/6.1 |
| 5,136,765 | 8/1992 | Tanaka et al. | |
| 5,589,067 | * 12/1996 | Rice | 210/493.5 |
| 5,647,257 | * 7/1997 | Maida et al. | 83/332 |
| 5,896,635 | * 4/1999 | Marlow et al. | 29/6.1 |

FOREIGN PATENT DOCUMENTS

| | | | |
|---|---|---|---|
| 0435266 | 7/1991 | (EP) . | |
| 2071530 | 9/1981 | (GB) . | |
| 2249280 | * 5/1992 | (GB) | B23D/15/08 |
| 1127119 | * 5/1989 | (JP) | 29/6.2 S |
| 9-22700 | 1/1997 | (JP) . | |
| WO 90/06000 | 5/1990 | (WO) . | |

* cited by examiner

Primary Examiner—David P. Bryant
Assistant Examiner—Essama Omgba
(74) Attorney, Agent, or Firm—Jordan and Hamburg LLP

(57) ABSTRACT

An apparatus and method for producing expanded mesh sheets provides for forming fine slits in a metal sheet at a slit section by plate cutters, but excluding portions in a center and both sides in a widthwise direction of the metal sheet. The areas where the slits have been formed are drawn out at an expanding section thereby opening the slits and obtaining a mesh sheet which has solid portions in the central portion and on both sides. The mesh sheet is flattened at a rolling device to obtain the expanded mesh sheet. An electrode sheet is prepared by applying an active material onto mesh portions of the expanded mesh sheet, and collectors for a battery are cut out from the electrode sheet such that lead connecting portions thereof are located at the solid portion of the mesh sheet where there are no openings.

5 Claims, 12 Drawing Sheets

METHOD AND APPARATUS FOR MANUFACTURING EXPANDED MESH SHEET AND BATTERY USING THIS EXPANDED MESH SHEET

BACKGROUND OF THE INVENTION

1. Field of the Invention

The present invention relates to an expanded mesh sheet that is preferable for use as a battery collector, and more particularly to a method and apparatus for manufacturing an expanded mesh sheet with which a fine reticulated configuration can be formed in a thin metal sheet for realizing smaller, thinner, and higher capacity batteries, and to a battery using this expanded mesh sheet.

2. Description of the Related Art

As portable instruments such as portable telephones have become smaller, thinner, and lighter in weight, the batteries used as a source of power by such instruments have been required to have higher capacities, as well as to be smaller and lighter. FIGS. 13 and 14 show the constitution of a polymer electrolyte secondary cell, a type of battery developed in response to these requirements. This battery comprises a laminated electrode 4, of positive electrode plates 1 and a negative electrode plate 2 laminated together with separators 3 therebetween, held within an outer case 7 comprising a laminated sheet. As shown in FIG. 14, which shows a cross sectional view of FIG. 13 at line XIV—XIV, the above-mentioned positive electrode plate 1 is formed of positive electrode active material 1b coated on a positive electrode collector 1a; the above-mentioned negative electrode plate 2 is formed of negative electrode active material 2b coated on a negative electrode collector 2a. The positive electrode plate 1 and negative electrode plate 2 are layered together with separators 3, consisting of solid electrolyte material therebetween, and sealed along with liquid electrolyte within an outer case 7, comprising a pair of laminated sheets heat fused along their perimeters at seal portions $P_1$, $P_2$, $P_3$. The positive electrode lead 8 is connected to the lead connecting portions 1c, 1c each formed on the two positive electrode collectors 1a, 1a and the negative electrode lead 9 is connected to the lead connecting portion 2c formed on the negative electrode collector 2a. The positive electrode lead 8 and negative electrode lead 9 are insulated from each other with an insulating sheet 6 and drawn out to the outside of the outer case 7 so as to be used as battery connection terminals for the positive and negative electrodes of the battery.

The above-mentioned positive electrode plate 1 and negative electrode plate 2 are manufactured as follows. The positive electrode active material, prepared as a paste, is applied on an expanded mesh sheet of aluminum that will constitute the positive electrode collector 1a, which is then dried and rolled to form a positive electrode sheet. The positive electrode place is cut to a prescribed form and size from this positive electrode sheet thus obtained wherein the positive electrode active material 1b is adhered to a prescribed thickness on the positive electrode collector 1a. Also, the negative electrode active material, prepared as a paste, is applied on both surfaces of an expanded mesh sheet of copper that will constitute the negative electrode collector 2a, which is then dried and rolled to form a negative electrode sheet. The negative electrode plate is cut to a prescribed form and size from this negative electrode sheet thus obtained wherein the negative electrode active material 2b is adhered to a prescribed thickness on both surfaces of the negative electrode collector 2a. As shown in FIG. 13, the positive electrode plate 1 and negative electrode plate 2 are cut from the positive electrode sheet and negative electrode sheet respectively, such that the lead connecting portion 1c protrudes from the positive electrode collector 1a at a position offset from the center line, and such that the lead connecting portion 2c protrudes from the negative electrode collector 2a at a position offset from the center line opposite from the lead connecting portion 1c of the positive electrode collector 1a. The aluminum positive electrode lead 8 is joined to the lead connecting portion 1c of the positive electrode collector 1a, and the copper negative electrode lead 9 is joined to the lead connecting portion 2c of the negative electrode collector 2a, respectively, at welding points S using resistance welding or ultrasonic welding.

In order to satisfy the requirement that a battery be small, light, and have higher capacity, the expanded mesh sheet used as a collector must be thin, with a fine mesh grid, and yet have the strength to withstand the tensile force applied during manufacture. Moreover, the mesh sheet must be superior in binding properties to the active material and collecting properties.

In the collector, the electrodes of same polarity are connected to each other at the lead connecting portions, and the lead is further connected thereto. Therefore, the lead connecting portions are required to have better welding properties as the number of laminated positive and negative electrodes increases. However, in collectors wherein an expanded mesh sheet with a high rate of openings is used, the lead connecting portions tend to have poor welding properties, and low bonding strength and conductivity between collectors and leads.

The above-mentioned expanded mesh sheet is manufactured by pulling a metal sheet, wherein slits have been formed in a zigzag pattern, in a direction perpendicular to the orientation of the slits, thereby opening the slits to form a lozenge-shaped reticulated configuration.

In other words, as shown in FIG. 15A, a multiplicity of slits a are formed intermittently and parallel to each other in the direction in which the metal sheet A extends. The slits a are arranged in a zigzag pattern, with the parallel and adjacent positions being offset in the direction in which the metal sheet A extends; nodes b are formed between intermittent slits a, a. Furthermore, as shown in FIG. 15B, bulges c are formed by plastic deformation at positions sandwiched between slits a, a juxtaposed in a widthwise direction, protruding from both surfaces of the metal sheet alternately in opposite directions. Such a metal sheet, wherein slits a, nodes b, and bulges c have been formed, is pulled widthwise as shown in FIG. 16 to attain an expanded mesh sheet having a mesh grid structure, wherein the slits a, a are opened thus forming lozenge-shaped openings surrounded by linear lattice bars d connected by nodes b.

Current methods for manufacturing this type of mesh sheet include those using a rotary system and those using a reciprocating system.

FIG. 17 shows an example of a rotary-type apparatus for manufacturing expanded mesh sheets. This apparatus includes a pair of rollers 100, 100 which is constructed such that a plurality of disk-shaped cutters 31, that are provided with raised portions 32 for forming the above-mentioned bulges c on the periphery, are superposed coaxially at intervals approximately equal to the thickness of the disk-shaped cutters 31. The rollers 100, 100 are disposed opposite to each other with their axes being parallel and their positions in the axial direction being offset by the thickness of the disk-shaped cutters 31. Blades for forming the slits a in the direction in which the metal sheet A is supplied and in an area between the disk-shaped cutters 31 of one roller 100 and the disk-shaped cutters 31 of the other roller 100, are formed on both edges of each disk shaped cutter 31. Recessed portions 33 for interrupting the formation of the slits a and for forming the nodes b are formed at a prescribed pitch on the blades in the direction of the circumference of the disk-shaped cutters 31. By supplying the metal sheet A between the rollers 100, 100 and rotating the rollers 100, 100 around their respective axes, the slits a connected with the nodes b are formed in the metal sheet A, as well as the bulges c protruding in mutually opposite directions are formed at positions where slits a, a, are juxtaposed with each other, as shown in FIGS. 15A and 15B.

One disadvantage of such rotary system is that the disk-shaped cutters 31 need to have at least a certain minimum thickness in order to ensure the strength of the disks, wherefore there are limits to the thinness and fineness of the cutters. For this reason, the above-mentioned reciprocating system is more appropriate for manufacturing expanded mesh sheets with a fine mesh grid.

In the method of manufacturing expanded mesh sheets with a reciprocating system, slits j are formed intermittently and widthwise in an elongated sheet 55 in such a manner that the slits j are arranged in a zigzag pattern offset in the direction of the orientation of the slits as shown in FIG. 19 by a pair of upper and lower plate cutters 53, 54 as shown in FIG. 18, one row at a time. The cutters 53, 54 include raised portions as part of slit forming blades, with which bulges k are formed at the same time that the slits j are formed. The elongated sheet 55, in which the slits j and bulges k have been formed in a zigzag pattern, is pulled in a direction lengthwise to the elongated sheet as shown in FIG. 19, whereupon the slits j and bulges k are spread out and an expanded mesh sheet having a lozenge-shape mesh is attained.

The above-described method for manufacturing expanded mesh sheets with a reciprocating system has problems of high costs, low productivity, and slow working speed because the slits j are made one row at a time. Also, it is preferable that the ends of the expanded mesh sheet include solid portions where a mesh is not formed in order to ensure the strength to withstand processes of applying active material to and rolling the thin expanded mesh sheet and in order to form lead connecting portions for connecting leads to the collectors. However, with the reciprocating system as shown in FIG. 18, a mesh structure has to be formed on the entire surface of the mesh sheet because of the specific expanding method, wherefore it was impossible to manufacture an expanded mesh sheet provided with solid portions which has no reticulated configuration.

SUMMARY OF THE INVENTION

It is an object of the present invention to provide a method and apparatus for manufacturing an expanded mesh sheet wherein a fine mesh grid structure is formed in a thin metal sheet by a reciprocating system efficiently including solid portions where there is not provided a reticulated configuration, and to provide a battery using this expanded mesh sheet.

The method of manufacturing an expanded mesh sheet according to the present invention comprises the steps of: supplying an elongated sheet between an upper mold and lower mold, comprising a plurality of plate cutters that have a plurality of blades for forming slits and that are superposed at prescribed intervals; intermittently forming a plurality of slits in a zigzag arrangement lengthwise to the elongated sheet by reciprocating movements of said upper mold and lower mold in opposite directions; and pulling the elongated sheet in a direction so as to expand widthwise dimensions of the elongated sheet, whereby a mesh grid is formed in the elongate sheet.

According to this manufacturing method, slits are formed in a plurality of rows at once in the elongated sheet by plastic working using an upper mold and lower mold comprising a plurality of superposed plate cutters in an area defined by the length of the plate cutters and the width of the superposed plate cutters, whereby the mesh can be formed efficiently even with the reciprocating system. Also, the thickness of the plate cutters can be made thinner without losing their strength and rigidity, wherefore formation of a fine mesh grid structure is possible. Furthermore, by adding a process of rolling the mesh sheet following expansion thereof, an expanded mesh sheet is formed to be further thinner, from which a thin collector with the fine mesh grid structure required for the manufacture of small, thin, high capacity batteries can be obtained.

Also, by manufacturing the expanded mesh sheet such that when forming slits, a band of solid portion lengthwise to the elongated sheet at prescribed locations is provided so that the elongated sheet, after being expanded, has a portion where there is no mesh grid, the tensile strength of the elongated sheet increases thanks to this solid portion, by which the elongated sheet will have enough strength to withstand the tension during transportation or rolling process even with a thin thickness. Also, when used in battery collectors, these solid portions can be used to form lead connecting portions for the electrode plates. This can improve the welding properties of electrode plates to leads.

An apparatus for manufacturing an expanded mesh sheet according to the present invention comprises: slit forming means including an upper mold and a lower mold, each of the upper mold and lower mold comprising a plurality of plate cutters superposed at internals roughly equal to the thickness thereof, the plate cutters having blades formed on both faces thereof, a plurality of protrusions projected at prescribed intervals, and recessed portions provided between said protrusions by cutting away one surface and the other surface or said blades at an angle alternately, wherein said upper mold and lower mold are positioned opposite to each other and offset by the thickness in the direction in which the plate cutters are superposed, said upper mold and lower mold being driven to reciprocate in opposite directions, thereby forming a plurality of slits in a lengthwise direction intermittently and in a zigzag arrangement in an elongated sheet fed between said upper mold and lower mold in a lengthwise direction of said plate cutters; means for conveying said elongated sheet lengthwise to the plate cutters in the slit forming means; expanding means for pulling the elongated sheet in a direction so as to expand widthwise dimensions of the elongated sheet and opening said slits thereby producing a mesh sheet having a reticulated configuration; and rolling means for flattening said mesh sheet from both upper and lower surfaces.

According to this construction, slits can be formed at once in a prescribed area even with the reciprocating system, whereby processing speed can be remarkably increased as compared with a conventional construction wherein slits are formed one row at a time. Also, since plate cutters are used for forming slits, machining precision of the cutters can be readily attained thereby reducing cost for molds. Also, by making the thickness of the plate cutters thinner, a fine mesh can be formed, and the thin collectors having the fine mesh grid structure required for the manufacture of small, thin, high capacity batteries can be obtained from this expanded mesh sheet.

In the above construction, the thickness of the plate cutters may gradually increase toward the sides of the upper mold and lower mold, by which the width of the linear lattice bars forming the lozenge-shaped cells constituting the mesh grid structure gradually increases towards the edges of the sheet, and the strength of the side portions of the sheet to which particularly strong tension is applied can be improved.

Furthermore, by providing a configuration such that the blades between the recessed portions of the plate cutters are formed such that corner parts are chamfered away towards the recessed portions on both sides, the nodes connecting the cells in the mesh grid are widened and both corners formed by the ends of the long diagonals of the cells are formed with an obtuse angle, by which the strength of the mesh structure is further increased.

Furthermore, the upper mold and loser mold are constructed such that the plate cutters are not disposed at positions corresponding to prescribed areas in a widthwise direction of the elongated sheet, so that solid portions where slits are not formed are provided lengthwise to the elongated sheet. The strength of the mesh sheet to the tension exerted thereto during transportation or rolling process is thereby enhanced. Also, when using the mesh sheet as a battery collector, connecting portions for drawing out leads are cut out from this solid portions, whereby the welding properties between the electrodes and leads can be improved.

Furthermore, bending means for forming indentations or bosses in the solid portions of the elongated sheet before rolling the elongated sheet is provided, by which indentations or bosses are formed in the solid portions of the elongated sheet, which provide a play when the solid portions are expanded, thereby adjusting elongation of the meshed portion and the solid portions when the mesh sheet is rolled, thereby producing an expanded mesh sheet with less deformation caused by rolling.

Also, the battery according to the present invention comprises a positive electrode plate and a negative electrode plate that are obtained by applying active materials on a collector formed of an expanded mesh sheet, said positive electrode plate and negative electrode plate being laminated with layers of electrolyte interposed therebetween and sealed within an outer case together with an electrolyte solution, and leads connected to respective lead connecting portions of the collectors of each positive electrode plate and negative electrode plate, that are drawn out from the outer case to form a positive electrode and a negative electrode of the battery, wherein said expanded mesh sheet is made of an elongated metal sheet with a thickness of 0.1 mm or less and provided with a band of solid portion lengthwise to the elongated metal sheet at a given location in a widthwise direction of the elongated metal sheet where there is no reticulated configuration; and said collectors are cut from said expanded mesh sheet such that the lead connecting portions are positioned in said solid portion thereby constructing said positive electrode plate and negative electrode plate.

According to this configuration, collectors are cut out from the expanded mesh sheet such that lead connecting portions are positioned at solid portions provided in the mesh sheet. There is thus no opening of the mesh grid structure in the lead connecting portions, and when connecting the lead connecting portions with each other and with leads by welding, the connection becomes secure, whereby a battery of high collecting properties can be constructed. Also, the tension strength of the thin expanded mesh sheet is improved thanks to the solid portions, thereby attaining enough strength to withstand the tension during transportation or rolling process in the manufacturing process of positive and negative electrodes. Also, by forming the collectors using the expanded mesh sheet being thin and having a fine reticulated configuration, discharge characteristics and collection properties of the batteries can be enhanced. This also makes it possible not only to reduce the weight of the battery, but also to increase the amount of active material coated on thereon, thereby increasing the battery capacity.

In the above construction, the solid portions provided in the expanded mesh sheet are formed lengthwise to the elongated sheet in the widthwise central portion and on both sides. As a result, the tensile strength is equalized in a widthwise direction and deformation during transport and rolling is suppressed. Moreover, collectors can be cut away without waste of material since the solid portion in the central area can be used for a lead connecting portion.

By manufacturing the expanded mesh sheet using an aluminum or copper sheet, a mesh sheet of aluminum is used as the collector for a positive electrode of a battery and a mesh sheet of copper is used as a collector for a negative electrode.

Also, the reticulated configuration formed in the expanded mesh sheet comprises lozenge-shaped cells of which length of shorter direction is within a range 0.5 to 2.0 mm. Manufacture of an expanded mesh sheet with a fine reticulated configuration for constituting a smaller battery of a higher performance is thereby possible. Furthermore, since the distance between the active material to the mesh sheet is equalized, a collector which helps exhibit good discharging characteristics and collecting properties can be obtained.

These and other objects, features and advantages of the invention will become more apparent upon a reading of the following detailed description and drawings.

DESCRIPTION OF PREFERRED EMBODIMENTS

Below, preferred embodiments of the present invention are explained with reference to FIGS. 1 through 8.

Figure 1:
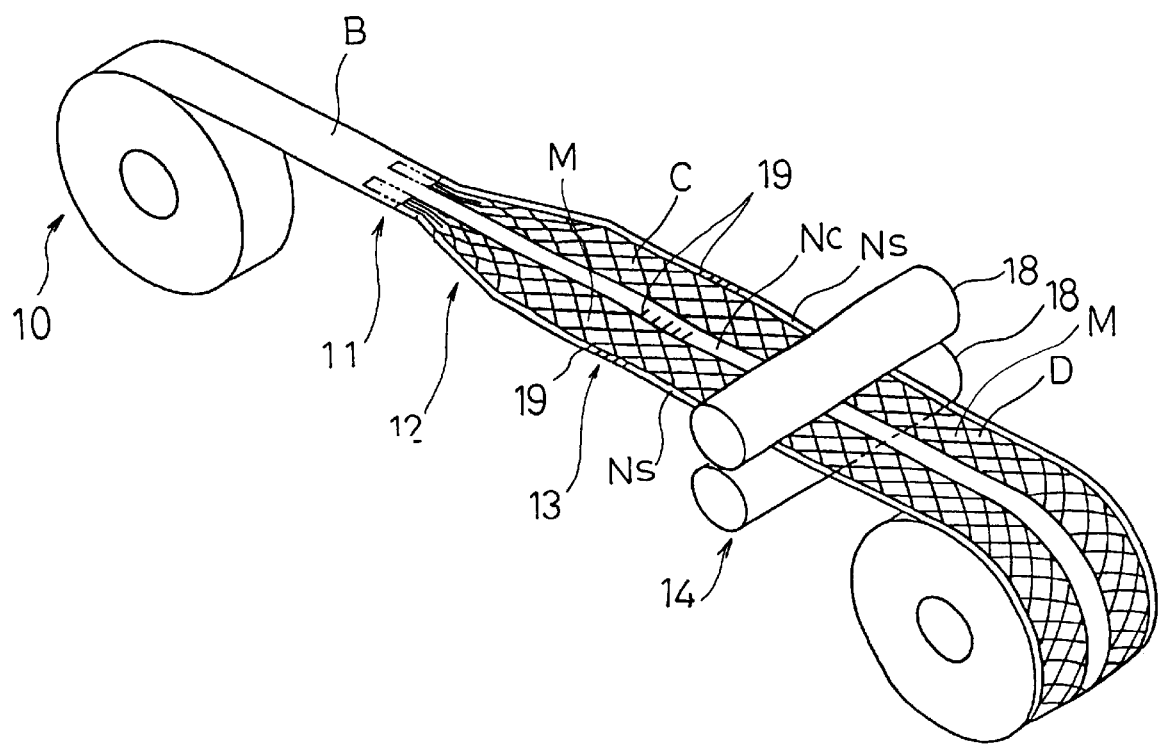
FIG. 1 is a perspective view showing a process of manufacturing an expanded mesh sheet according to the present invention.

FIG. 1 shows a manufacturing process according to a method for manufacturing an expanded mesh sheet of the present invention. The expanded mesh sheet in this embodiment is manufactured by forming a fine mesh grid in a thin, elongated metal sheet such as a copper sheet or aluminum sheet, with the provision of solid portions wherein the mesh grid is not formed in a central portion and both side edges of the sheet. This expanded mesh sheet is used, for example, as a collector for constituting electrode plates of a non-aqueous electrolyte battery.

Figure 2:
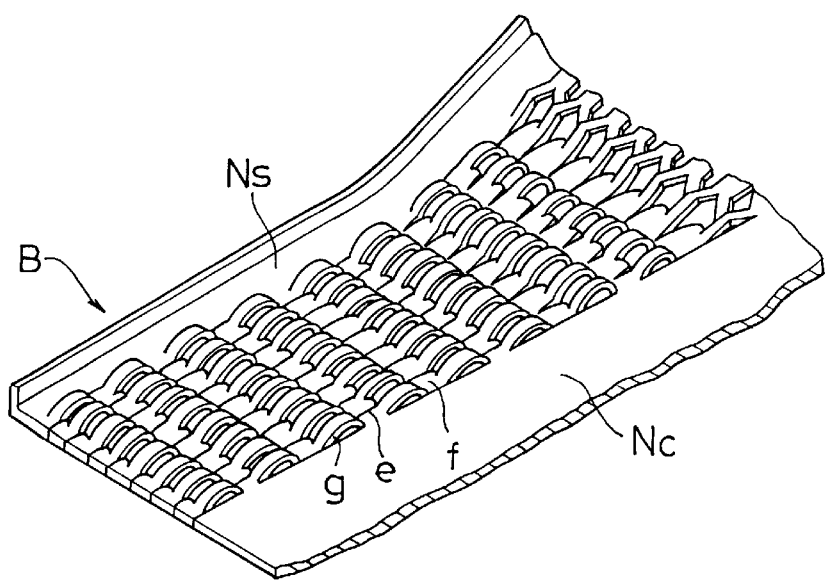
FIG. 2 is a partial perspective view showing a metal sheet wherein slits have been formed in a slit forming section.

In FIG. 1, a long metal sheet B, wound in a roll in a coil section 10, is reeled out from the end and delivered to a slit forming section 11. An upper mold and lower mold, comprising superposed plate cutters discussed below, are positioned opposite to each other in the slit forming section 11. By driving these molds in opposite directions, slits e are formed, and bulges g are also formed by plastic deformation, as shown in FIG. 2, in a prescribed region of the metal sheet B fed between the upper mold and lower mold. In the upper mold and lower mold disposed in the slit forming section 11, the above-mentioned plate cutters are not located at positions corresponding to a widthwise central portion and edge portions of the metal sheet B. As a result, the slits e are not formed in the widthwise central portion or at both side edges of the metal sheet 3.

The metal sheet B, wherein slits e have been formed, is delivered to an expanding section 12 by conveyor means (not shown), where the metal sheet B is drawn out in the widthwise direction so that the bulges g are spread out in the widthwise direction and the slits e are opened, whereby the areas where the slits are joined in a zigzag fashion with nodes f are expanded to become the mesh sheet C, wherein lozenge-shaped cells are disposed in a zigzag arrangement. In the subsequent bending section 13, groove-like indentations 19, or alternatively, bosses, are formed widthwise to the mesh sheet C in the central solid portion Nc and side solid portions Ns of this mesh sheet C, where there are no lozenge-shaped openings. These indentations 19 are discussed below with reference to FIGS. 6A and 63. The mesh sheet C that has been provided with the indentations 19 is rolled by compression rollers 18, 18 in the rolling section 14 to become the expanded mesh sheet D, and is wound into a roll.

The constitution of the slit forming section 11 for the expanded mesh sheet D, manufactured with the above-mentioned processes, is explained below.

Figure 3:
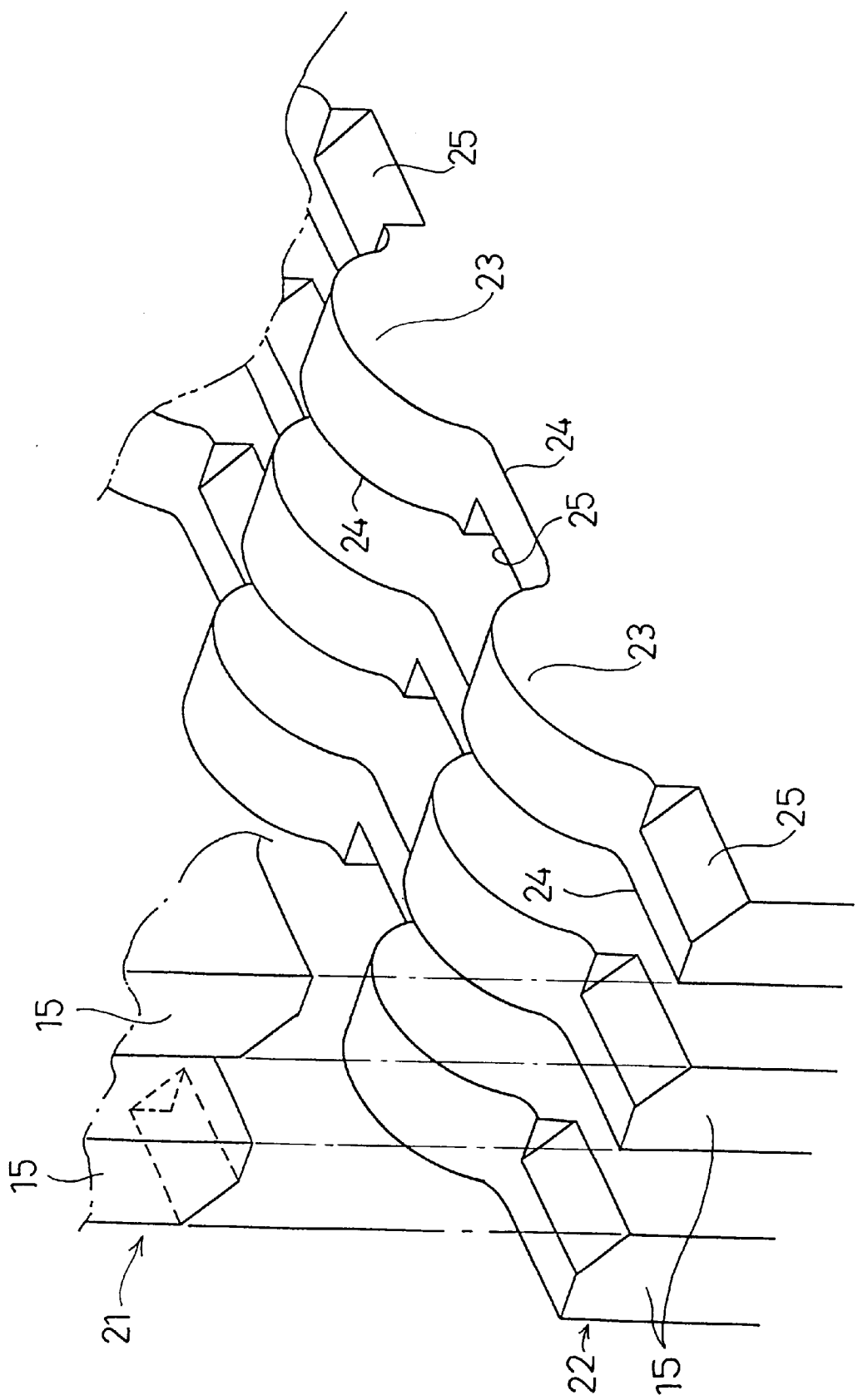
FIG. 3 is a partial perspective view showing plate cutters in the slit forming section.

FIG. 3 is a partial view of the upper mold 21 and lower mold 22 disposed in the slit forming section 11. A plurality of plate cutters 15, superposed at a prescribed space thereby constituting a shearing cutter are, formed with blades 24 of the shearing cutter on both sides thereof, and semicircular protrusions 23 are projected at prescribed intervals on the plate cutters 15. Furthermore, skip portions (or recessed portions) 25 are formed in straight areas between the above-mentioned protrusions 23 such that the blades 24 are cut away at an angle on one face of the place cutter 15 and on the other face thereof alternately. The plate cutters 15 of such a configuration are superposed at intervals which are approximately the same as the thickness of the plates 15, thereby forming each of the upper mold 21 and lower mold 22. The upper mold 21 and lower mold 22 are positioned so as to be opposed to each other and offset by the thickness of the plate cutters 15 in the direction in which the plate cutters are superposed. By driving the upper mold 21 and lower mold 22 in mutually opposite directions, the plate cutters 15 of the upper mold 21 and plate cutters 15 of the lower mold 22 are meshed together, by which slits e are formed, with bulges g due to the above-mentioned protrusions 23, as shown in FIG. 2, in the metal sheet B fed therebetween.

Figure 4A:
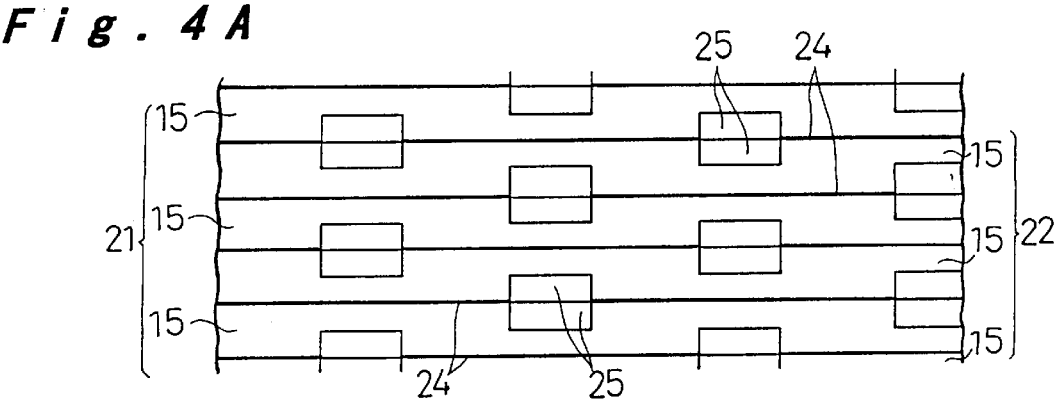
FIG. 4A is a plan view showing the slit forming section where the upper mold and lower mold engaged.
Figure 4B:
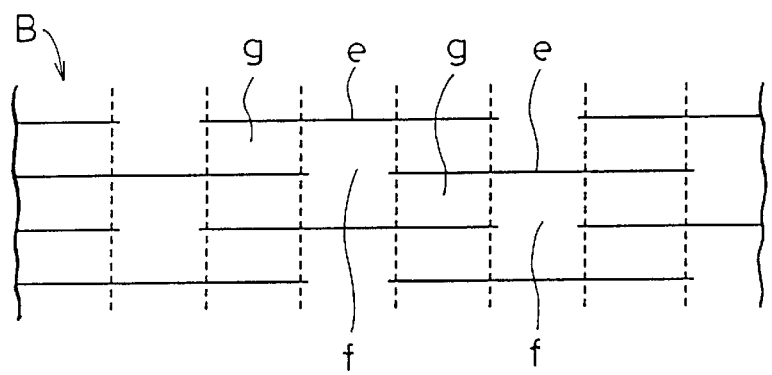
FIG. 4B is a plan view showing the state where slits are formed in the metal sheet.

FIG. 4A shows a plan view of the state where the above-mentioned upper mold 21 and lower mold 22 are engaged, and corresponding thereto, FIG. 4B shows the state of the metal sheet B that is fed between the upper and lower molds in the position shown in FIG. 4A and formed with slits e. As shown, the slits e are intermittently formed in a zigzag arrangement at positions where the upper and lower blades 24, 24 meet, whereas no slits e are formed at positions where the upper and lower skip portions 25, 25 meet, since the blades 24 are cut away as described above. In other words, nodes f are formed between the intermittent slit e. Also, bulges g, protruding alternately from both surfaces of the metal sheet B, are formed by the protrusions 23 at positions where the slits e, e are juxtaposed in parallel.

Figure 14:
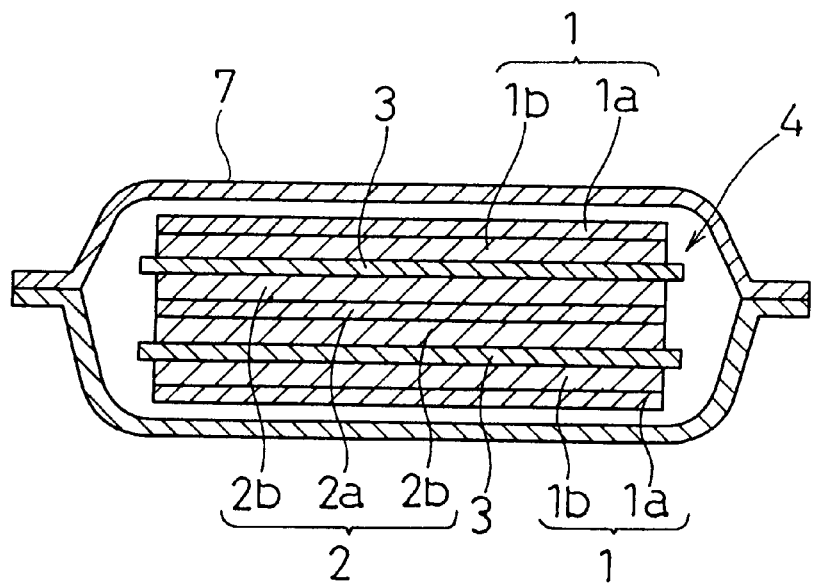
FIG. 14 is a cross-sectional view of FIG. 13 at line XIV—XIV.
Figure 15A:
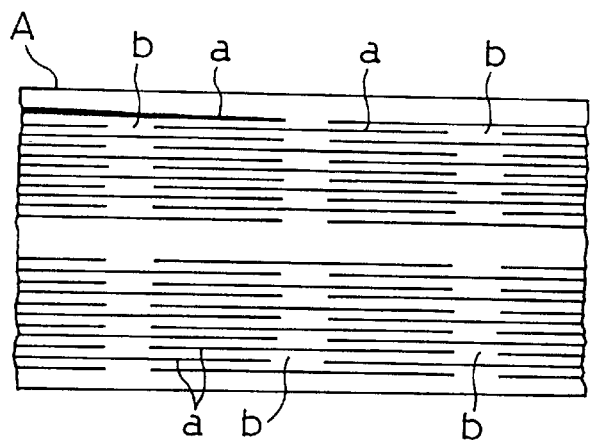
FIG. 15A is a plan view showing the state wherein slits are formed in the metal sleet.
Figure 15B:
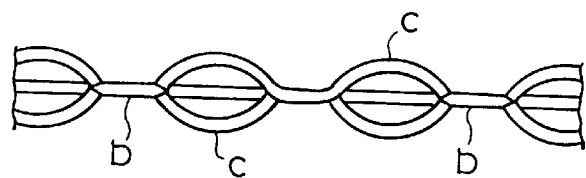
FIG. 15B is a side view of the same.
Figure 16:
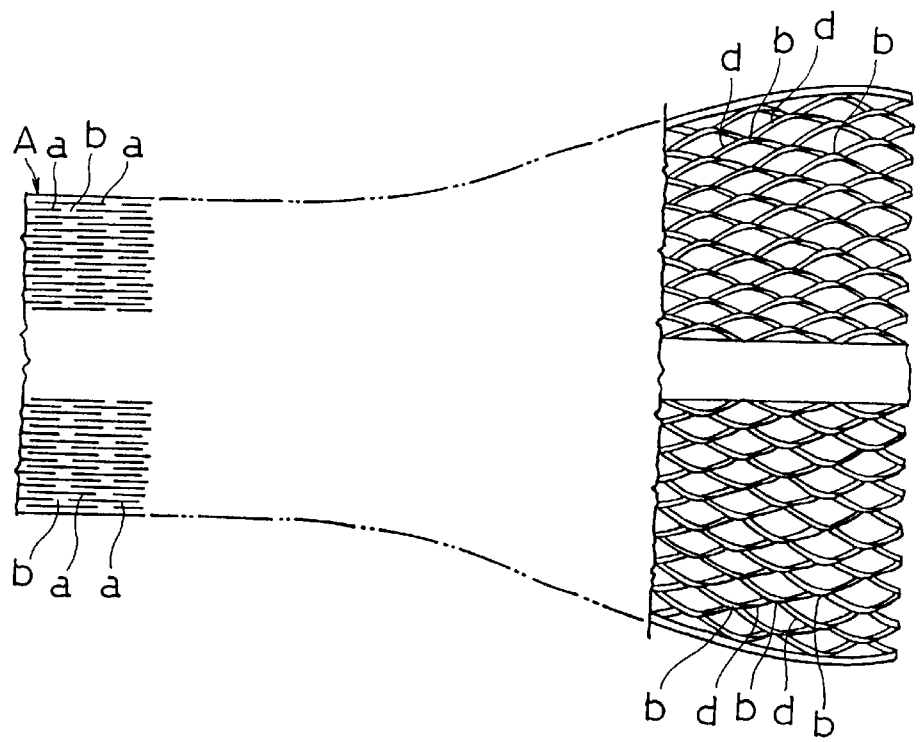
FIG. 16 is a plan view showing the state where the reticulated configuration is being formed in the metal sheet by expanding.
Figure 17:
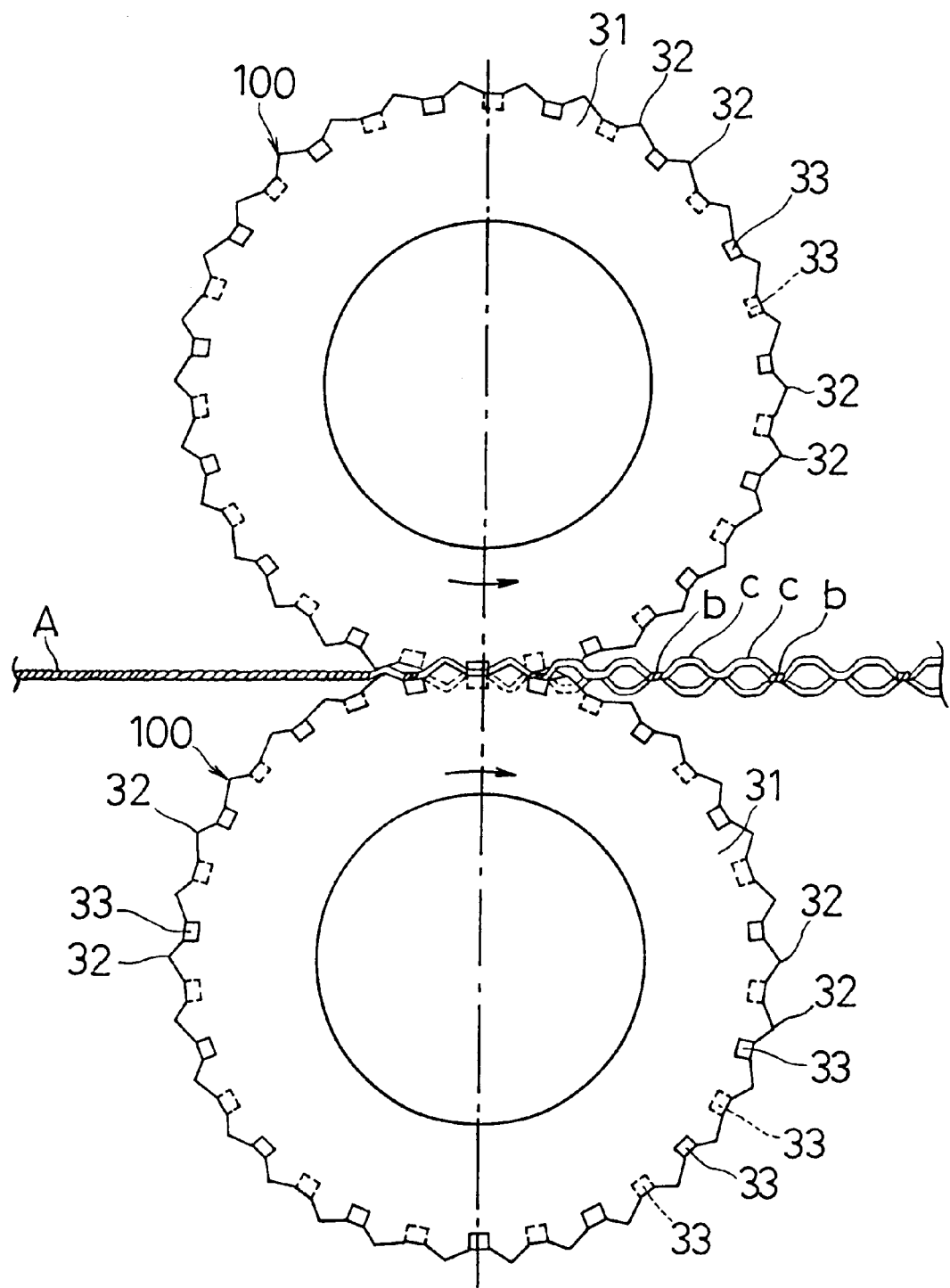
FIG. 17 is a side view showing a method of forming slits with a rotary system.
Figure 18:
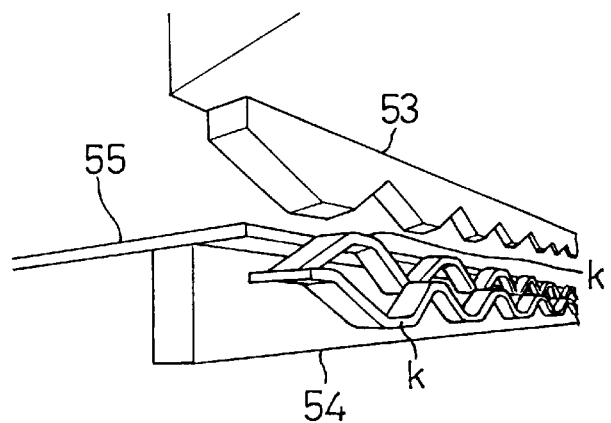
FIG. 18 is a perspective view showing a method of forming slits with a reciprocating system.
Figure 19:
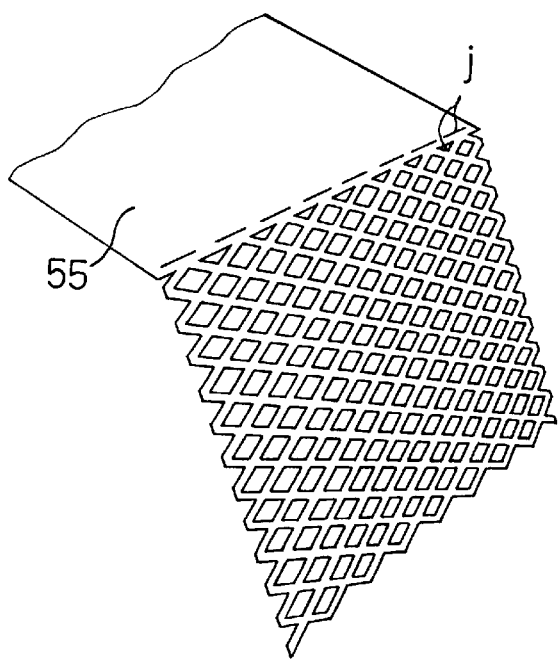
FIG. 19 is a perspective view showing the state where the slits formed by the reciprocating system are expanded.

As discussed above, the upper mold 21 and lower mold 22, of superimposed plate cutters 15, are moved upwards and downwards in the slit forming section 11, whereby rows of slits e are formed at the same time. It is therefore possible to form a plurality of slits at once in a prescribed area with a reciprocating system. The number of blades of the plate cutters 15 need to be only a fraction of the number of the blades formed on the edges of disk-shaped cutters 31 as shown in FIG. 14, and since these are laid out in a plane, each cutter can be made small in size and thickness, whereby fine slits can be formed that was unattainable with a rotary system. With these plate cutters 15, it is possible to form fine slits down to a minimum thickness of 100 $\mu$m. Consequently, manufacture of collectors with a fine mesh structure that is indispensable for the production of small, high capacity batteries becomes possible.

Figure 5A:
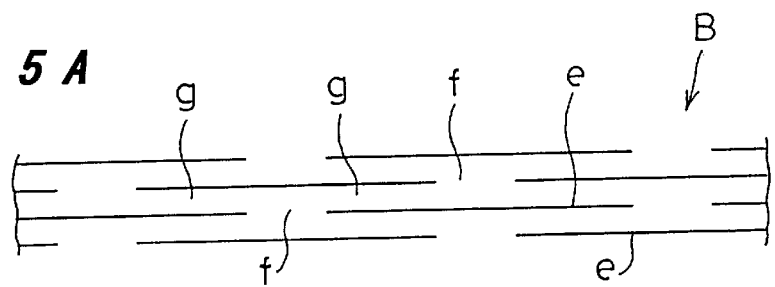
FIG. 5A is a plan view showing the state of the metal sheet wherein slits are formed before expanding.
Figure 5B:
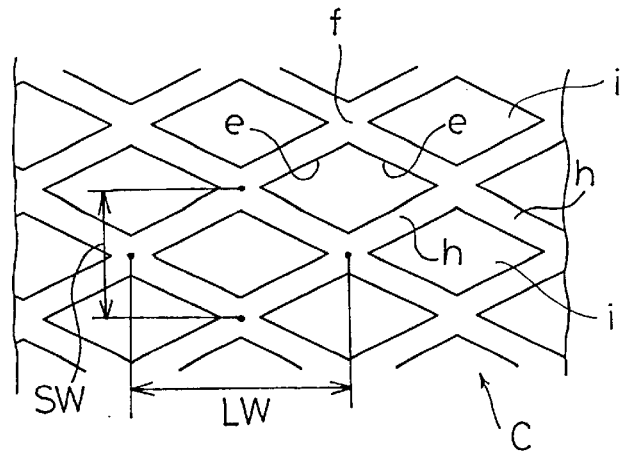
FIG. 5B is a plan view showing the state wherein the metal sheet is expanded to become a mesh sheet having a lozenge-shaped reticulated configuration.

Once the metal sheet B that has been provided with slits e, bulges g, and nodes f in the slit forming section 11 as shown in FIG. 5A is pulled and expanded widthwise in the expanding section 12, the mesh sheet C having a reticulated configuration is achieved, wherein the slits e have been opened and the bulges g have been expanded to form lozenge-shaped cells i surrounded by linear portions h, each cell i being joined by nodes f as shown in FIG. 5B. The amount of elongation of the area wherein the slits e are formed varies depending on the widthwise expansion of the metal sheet B. In this embodiment, the areas with slits e are expanded an amount such that a ratio of a long diagonal LW to a short diagonal SW of the lozenge-shaped cells that have been formed by the opening of the slits e is approximately 2:1.

Figure 6A:
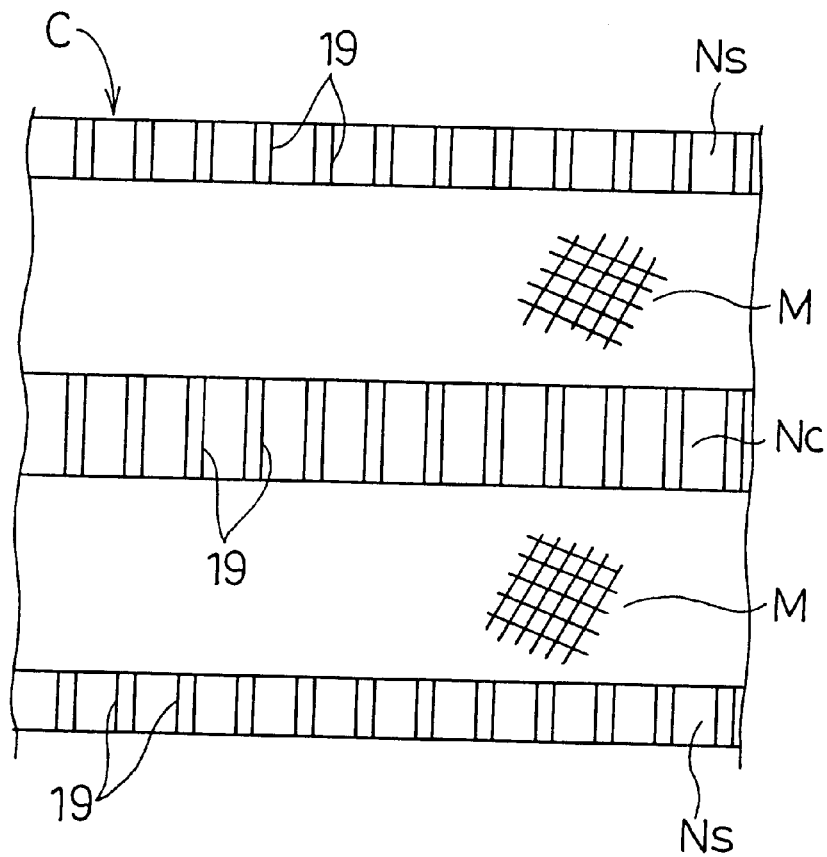
FIG. 6A is a plan view showing the state wherein indentations are formed in solid portions of the mesh sheet.
Figure 6B:
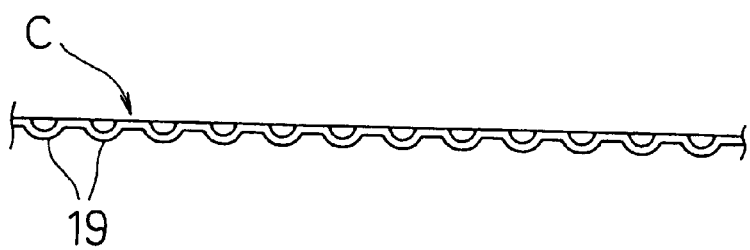
FIG. 6B is a side view of the sheet of FIG. 6A.

The mesh sheet C is then conveyed to the bending section 13, where the above-mentioned indentations 19 are formed in the central solid portion Nc and side solid portions Ns on either side of the mesh sheet. At the bending section 13, a male roller formed with protrusions in a widthwise direction at locations corresponding to the central solid portion Nc and side solid portions Ns, and a female roller formed with recesses corresponding thereto, are located opposite to each other (not shown). The mesh sheet C is passed and thus pressed between the male roller and female roller, whereby groove-like indentations 19 are formed in the widthwise direction as shown in FIGS. 6A and 6B, in the central solid portion Nc and side solid portions Ns on both sides. It is to be noted that the indentations 19 may also be formed as bosses which project from the top face of the sheet. The mesh sheet C that has been provided with the indentations 19 is then delivered to the rolling section 14.

The mesh sheet C is pressed between a pair of compression rollers 18, 18 having flat surfaces in the rolling section 14 so as to flatten out any irregularities in the meshed portion M and the indentations 19 in the solid portions Nc, Ns, and to make the thickness of the entire mesh sheet uniform. At this time, the elongation of the meshed portion M having the reticulated configuration it greater than that of the solid portions Nc, Ns, but the irregularity of the elongation is adjusted by the indentation 19 or bosses formed in the solid portions Nc, Ns. This can prevent deformation of the expanded mesh sheet D issued from the rolling section 14 and deformation or breakage of the meshed portion M. Consequently, the dimensions and number of the indentations 19 or bosses formed in said bending section 13 may be set so that the elongation of the meshed portion M when rolled out corresponds with that of the solid portions Nc, Ns, and the above-mentioned male roller and female roller may be formed on this basis.

The expanded mesh sheet D thus manufactured as described above has a much greater tensile strength thanks to the solid portions Nc and Ns than the case where there is no such solid portions. Manufacture of an expanded mesh sheet D, optimal for use as a collector in a thin, small battery, which has a strength to withstand the tension when transported through the processes, while having a fine reticulated configuration and being thin, is thereby possible.

Figure 7:
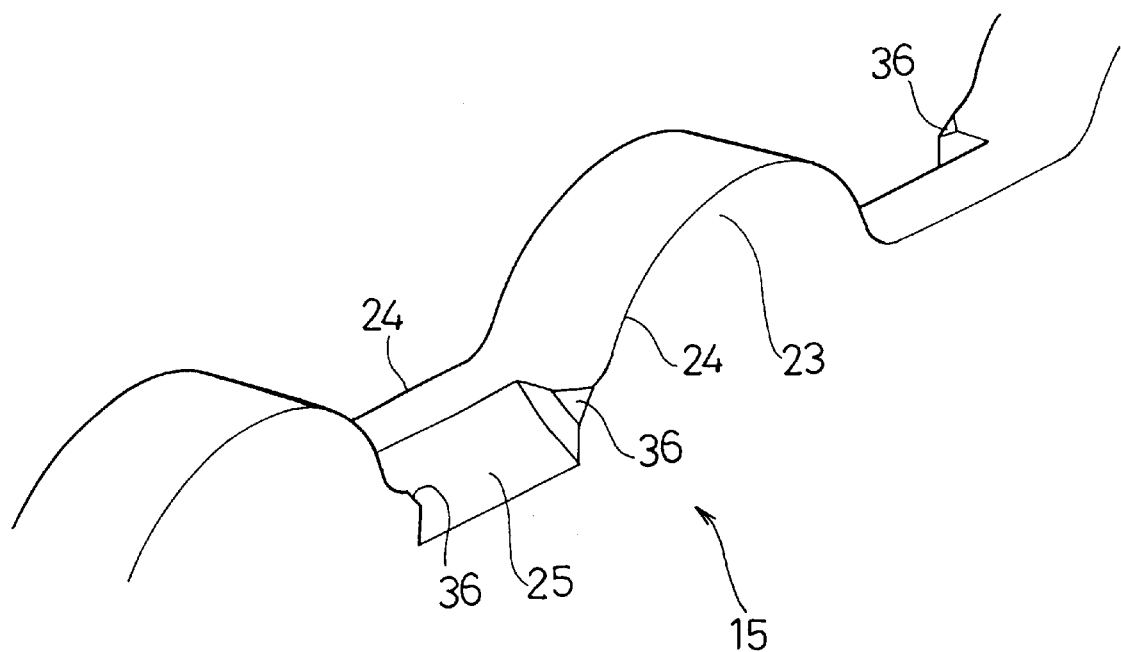
FIG. 7 is a perspective view showing a modification of the plate cutters in the slit forming section.
Figure 8:
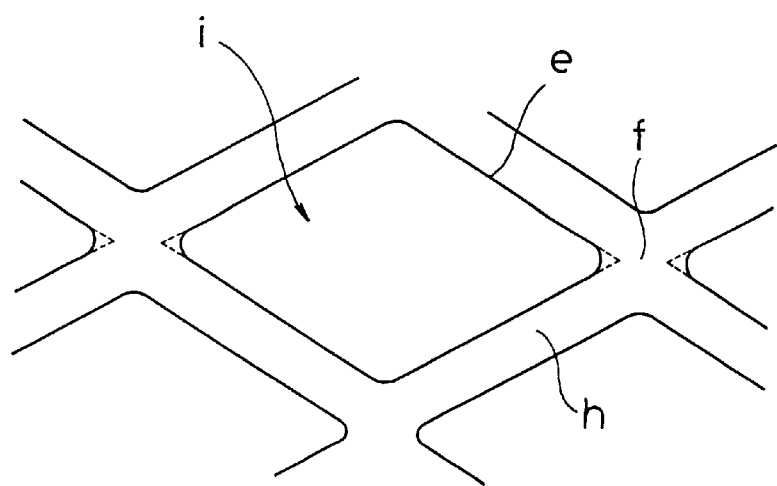
FIG. 8 is a plan view showing the reticulated configuration formed by those cutters.

FIG. 7 shows a modified example of the plate cutters 15 in the above-mentioned slit forming section 11. In this arrangement, the skip portions 25 of the plate cutters 15 that are formed by cutting away the blades 24 are provided with chamfers 36 on the corners thereof on both sides next to the blades 24, that are formed by cutting the corners away in a direction from the blades side towards the skip portions 25. This configuration further improves strength of the mesh grid. Specifically, the provision of the chamfers 36 increases the width of the part where slit formation by the blades 24 is interrupted by the skip portions 25. As a result, the slits e become slightly shorter and, in the lozenge-shaped cells i formed by the opening of the slits e when he metal sheet is spread out, the angle made at inner corners on both ends of a cell i in a lengthwise direction becomes not acute but obtuse which is rounded as shown in FIG. 8. The width of the nodes f connecting the lozenge-shaped cells i is thereby broadened, and the tensile strength of the mesh sheet is further increased as each of the cells i is connected by obtuse angles.

The lozenge-shaped cells i of the expanded mesh sheet D explained above basically have a uniform size. It is also possible for the size of the cells to gradually decrease towards the side edges of the mesh sheet or to vary at different locations. For example, if the widths of the panels forming the plate cutters 15 constituting the upper mold 21 and lower mold 22 gradually increase towards the side edges of the metal sheet B, the width of the linear lattice bars h surrounding the cells i gradually increases towards the side edges of the metal sheet B. This can further improve the strength of the side portions to which great force is applied when the sheet is expanded. The dimensions of the protrusions 23, blades 24, and skip portions 25 may be varied corresponding to changes in the thickness of the plate cutters 15, whereby the ratio of the long diagonal to the short diagonal of the lozenge-shaped cell i can remain the same, even if the size of the cells i changes.

Figure 9:
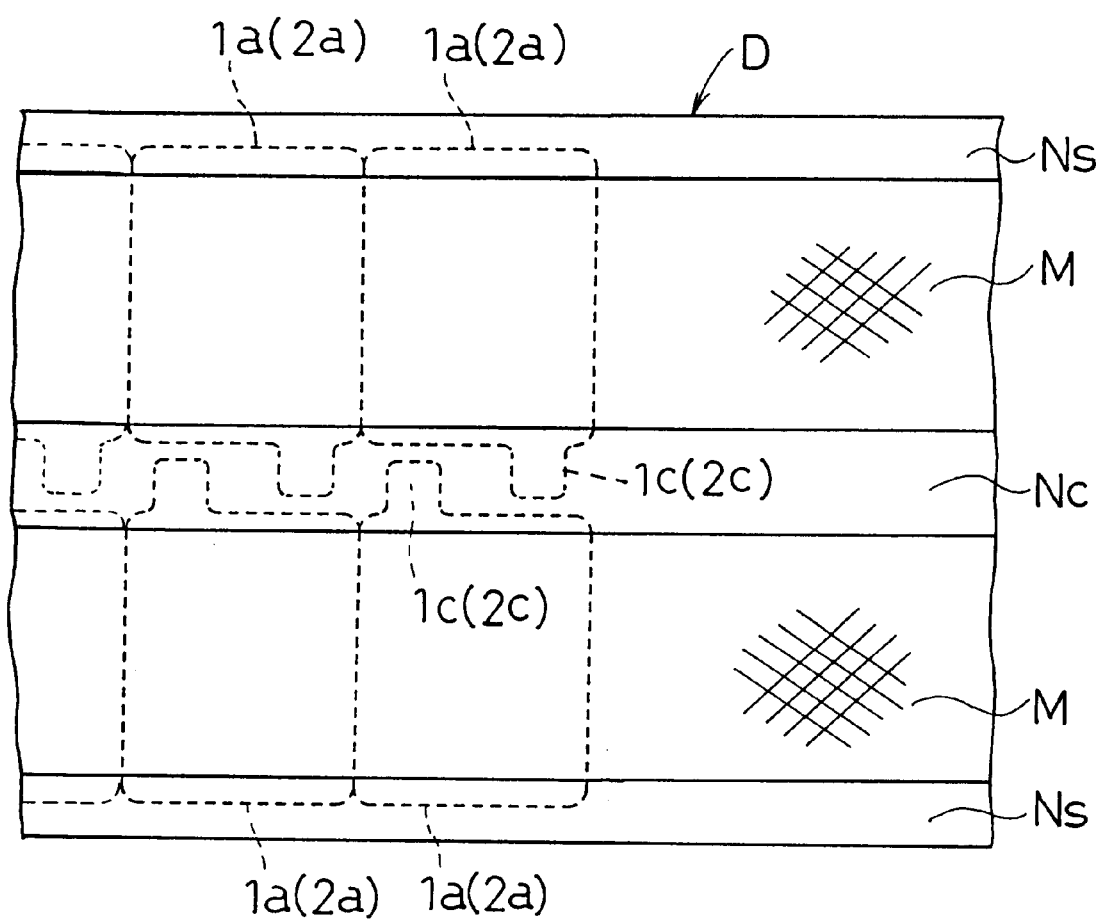
FIG. 9 is a plan view showing how collectors are cut from the expanded mesh sheet.

Next, the process for producing a polymer-electrolyte secondary cell using the expanded mesh sheet, manufactured as above, as a collector for the positive and negative electrode plates, will be explained with reference to FIGS. 9, 13, and 14.

The expanded mesh sheets are manufactured using metal sheets, aluminum for the positive electrode collector and copper for the negative electrode collector of the battery. Especially in the case of constituting a small, lightweight battery such as a polymer-electrolyte secondary cell, the collector is required to be as thin as possible. In this embodiment, a metal sheet of 0.06 mm thickness is used.

The expanded mesh sheet D prepared of an aluminum sheet is coated with a binding agent. Then the positive electrode active material 1b, prepared as a paste, is applied on the meshed portion M of the expanded mesh sheet D. After drying, this is rolled to form a positive electrode sheet with the prescribed thickness (0.15 mm in this embodiment).

Similarly, the expanded mesh sheet D prepared of a copper sheet is coated with a binding agent, after which the negative electrode active material 2b, prepared as a paste, is applied on the meshed portion M of the expanded mesh sheet D. After drying, this is rolled to form a negative electrode sheet with the prescribed thickness (0.32 mm, in this embodiment).

The positive electrode collector 1a and negative electrode collector 2a are cut out from the positive electrode sheet and negative electrode sheet obtained as above respectively to form the positive electrode plate 1 and negative electrode plate 2. At this time, the positive electrode collector 1a and negative electrode collector 2a are cut therefrom such that their respective lead connecting portions 1c, 2c are positioned on the central solid portion Nc formed in the expanded mesh sheet D as shown in FIG. 9, by which material is not wasted and the lead connecting portions 1c, 2c can be cut out from areas without openings.

The positive electrode plate 1 and negative electrode plate 2 that are thus obtained are layered with separators 3 interposed therebetween, heated between heated rollers, and compressed, thereby joining opposed surfaces by thermal fusion and forming a laminated electrode 4. Each of the lead connecting portions 1c of two sheets of the positive electrode collector 1a, 1a in this laminated electrode 4 are connected to the positive electrode lead 8 and with each other by welding. Similarly, the negative electrode lead 9 is connected to the lead connecting portion 2c of the negative electrode collector 2a by welding. As noted above, since each lead connecting portion 1c, 2c is cut out from the central solid portions Nc without the mesh grid of the expanded mesh sheet D, the welding is securely effected when resistance welding or ultrasonic welding is performed. Also, the connective properties of the lead connecting portions 1c, 2c with each lead 8, 9 are improved and the output of a high current becomes possible because the conductive surface area is large.

Figure 13:
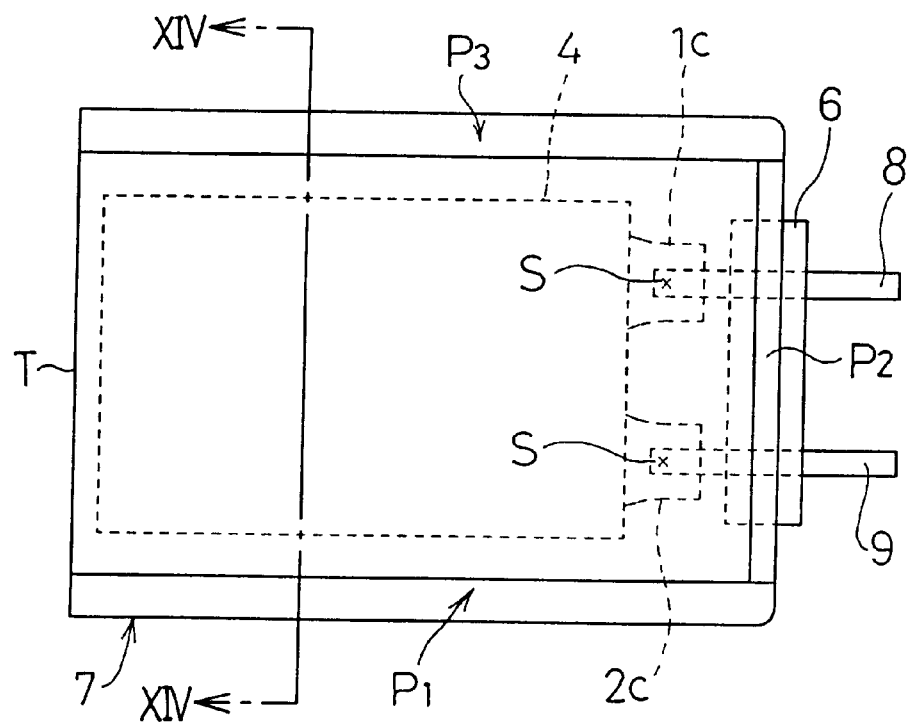
FIG. 13 is a plan view showing construction of a polymer electrolyte battery.

The laminated electrode 4, to which the leads 8, 9 are connected, is inserted into an outer case 7 formed in an envelope-like shape that is obtained by folding a laminate sheet folded at the fold line T and bonding seal portions $P_1$, $P_3$ by heat fusion as shown in FIG. 13. After injecting a prescribed quantity of liquid electrolyte into this outer case 7, the seal portion $P_2$ is bonded by heat fusion thereby sealing the laminated electrode 4 within the outer case 7 and completing a polymer electrolyte secondary battery.

Next, the relation between battery performance and the construction of the expanded mesh sheets D used as the collectors 1a, 2a for the polymer-electrolyte secondary cell constituted as explained above, is described.

The thickness of the expanded mesh sheets D, used as the collectors 1a, 2a for the small, lightweight non-aqueous electrolyte battery described above directly influences the thickness and weight of the battery, and thus is required to be as thin as possible, within a range wherein the battery performance and manufacturing process are not affected. Also, the thinner the thickness of the collectors 1a, 2a is, the more the active material 1b, 2b constituting the electrode plates can be increased, whereby the battery capacity can be made large even with the same electrode plate thickness. Consequently, although it is desirable to use a thinner expanded mesh sheet D, it was heretofore impossible to use sheets of less than 0.1 mm thick because of their limited mechanical strength. As noted above, however, the structure including solid portions Nc, Ns in the expanded mesh sheet D makes it possible to use sheets of less than 0.1 mm thick (0.06 mm in this embodiment).

Also, a minute reticulated configuration in the expanded mesh sheet D results in improved discharge characteristics of the battery since the distance between the collectors 1a, 2a and the active material 1b, 2b is equalized. However, there are machining limits of the cutters for forming slits in the metal sheet. Also, if the lozenge-shaped cells in the mesh grid are formed so that the ratio of the long diagonal LW in the lozenge shape to the short diagonal SW is 2:1, as shown in FIG. 5B, the bonding properties with the active materials and the discharge characteristics of the battery can be enhanced. Further, narrowing the widths of the linear lattice bars h forming the cells i improves the collection properties. However, in order for the mesh to have the strength to withstand the rolling process, and also in view of the above-mentioned limits to the cutters, the width of the linear lattice bars h should not be made narrower than 0.1 mm. In this regard as well, providing the solid portions Nc, Ns, as noted above, is effective in accomplishing the object to form a fine reticulated configuration in the expanded mesh sheet D thereby improving battery performance and yet maintaining the strength to withstand the manufacturing process.

As set forth above, according to the apparatus and method for manufacturing an expanded mesh sheet of the present invention, it is possible to form fine slits with the use of plate cutters, wherefore the manufacture of an expanded mesh sheet with a minute reticulated configuration is possible. As a result, it is possible to produce collectors having a fine mesh grid that is necessary for producing small, high capacity batteries. Also, when forming slits in the metal sheet, solid portions, here slits are not formed, are provided in the widthwise central portion and on both sides of the metal sheet, and an expanded mesh sheet, which is provided with solid portions, is obtained by expanding this metal sheet. The solid portions improve the tensile strength of the metal sheet and therefore help prevent the occurrence of breakage during transportation or rolling process in the manufacturing processes of the expanded mesh sheet and in the manufacturing processes of the battery electrodes using this sheet. Furthermore, the above-mentioned solid portions can also be used as areas for welding leads or the like when manufacturing the battery collectors. Since the welding is made at an area without openings, the connection of the electrode to the leads is superior, making possible the output of a high current and contributing to improvements in battery capacity.

Figure 10:
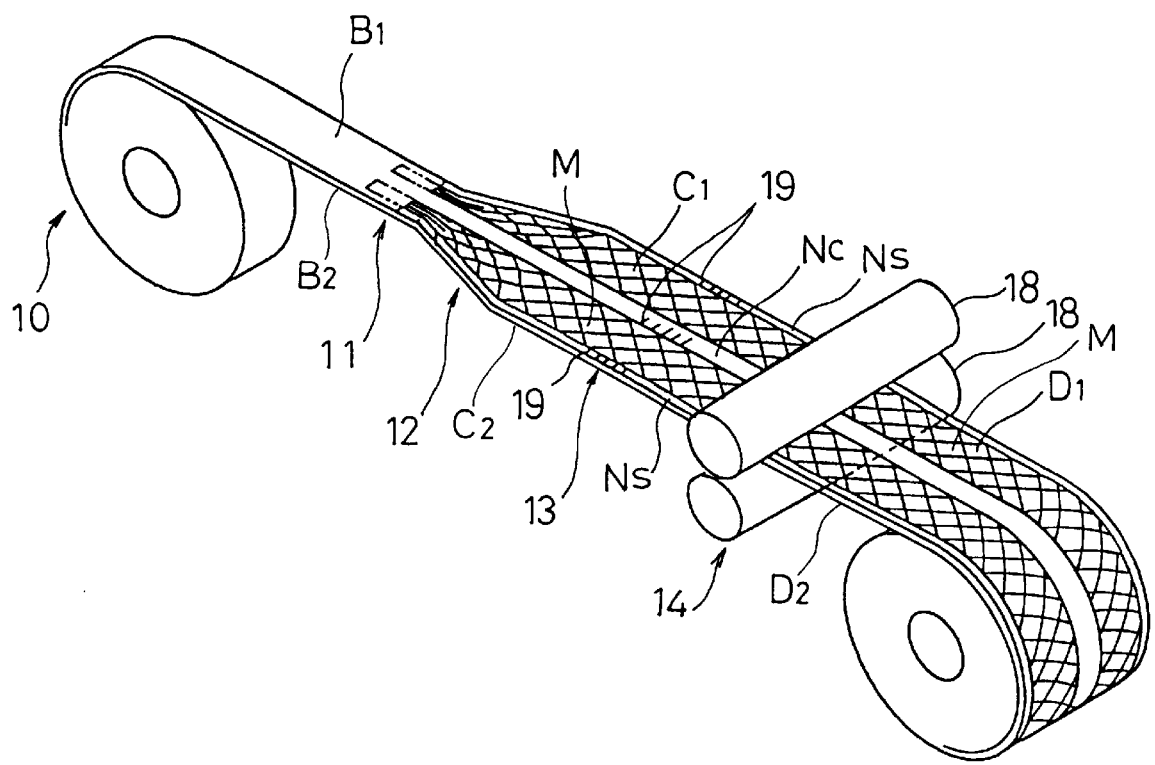
FIG. 10 is a perspective view showing a process of manufacturing a plurality of expanded mesh sheets at the same time.
Figure 11:
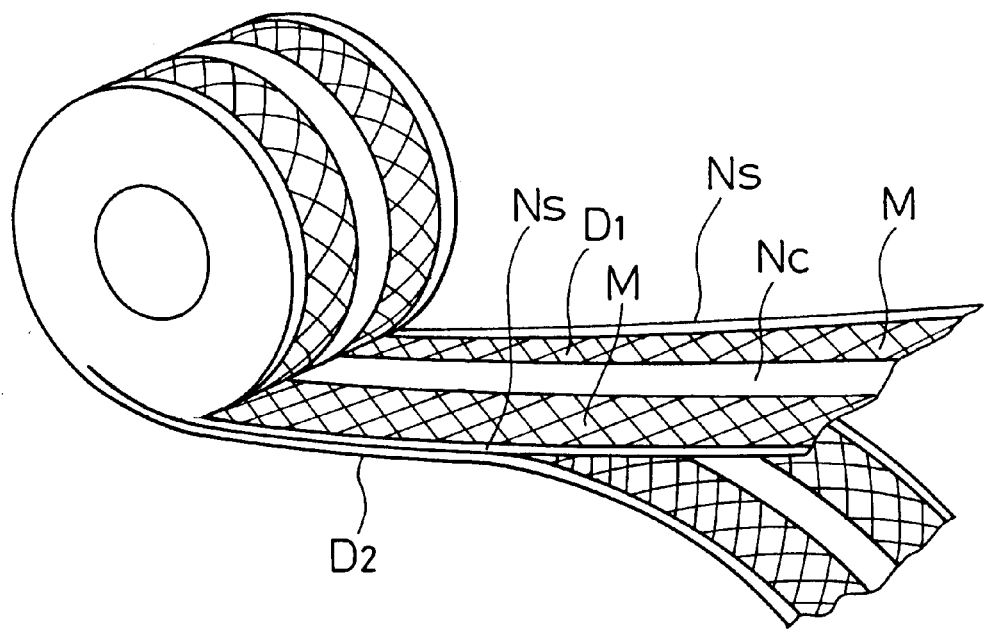
FIG. 11 is a perspective view showing a process of separating the plurality of expanded mesh sheets produced as shown in FIG. 10.
Figure 12:
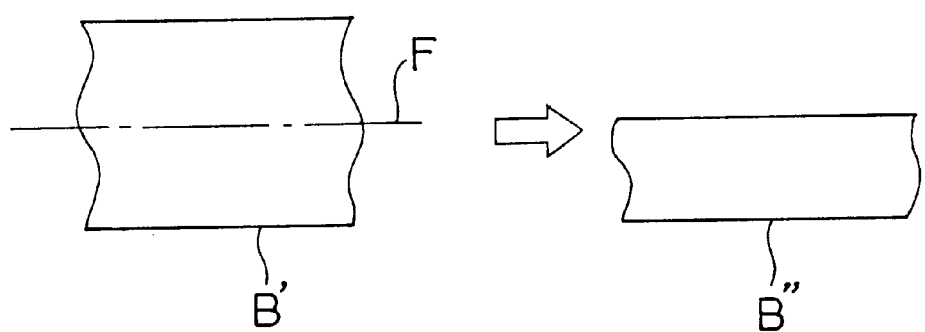
FIG. 12 is a plan view showing a state wherein a metal sheet is folded in half.

FIGS. 10 to 12 show a method of manufacturing an expanded mesh sheet by which a plurality of expanded mesh sheets D1, D2 can be produced at the same time from the same number of elongated metal sheets B1, B2.

More specifically, two strips of elongated metal sheets B1, B2, one being superposed on the other, are fed from the coil section 10 to the slit forming section 11. Successively, the metal sheets B1, B2 are delivered to the expanding section 12 where they are formed into mesh sheets C1, C2, which are further fed to the bending section 13 and the rolling section 14, thereby obtaining two strips of superposed expanded mesh sheets D1, D2, that are then wound in a roll. The descriptions of the coil section 10, slit forming section 11, expanding section 12, bending section 13, and rolling section 14 are omitted, as they are substantially the same as those explained with reference to FIG. 1 through FIG. 8.

Two superposed strips of expanded mesh sheets D1, D2 are separated as shown in FIG. 11. It is of course possible to superpose more than three strips of elongated metal sheets and to produce the same number of expanded mesh sheets therefrom at the same time, using the above method.

It is also possible to fold one wide and long metal sheet B' along a fold line F in a lengthwise direction to form a sheet B" comprising a plurality of elongated metal sheets superposed upon one another, as shown in FIG. 12. A plurality of expanded mesh sheets may be also manufactured at the same time using such folded metal sheet in accordance with the method as shown in FIGS. 10 and 11.

While a preferred embodiment of the invention has been described using specific terms, such description is for illustrative purposes only and it is to be understood that changes and variations may be made without departing from the spirit or scope of the following claims.

What is claimed is:

1. An apparatus for manufacturing an expanded mesh sheet from an elongated sheet, comprising:
   means for conveying said elongated sheet in a lengthwise direction thereof along a conveying path;
   slit forming means including an upper mold and a lower mold, each of the upper mold and the lower mold comprising a plurality of plate cutters superposed at intervals roughly equal to a plate thickness thereof, the plate cutters each having:
   opposing side faces extending to an edge extending in a lengthwise direction of the plate cutter whereat blades are formed at both of the side faces;

the edge extending in a plurality of protrusions projected at prescribed intervals with straight edge portions therebetween; and recessed portions provided between said protrusions at said straight edge portions formed by alternately beveling opposing ones of the side faces at the edge thereby interrupting the blades;

said upper mold and lower mold being disposed opposite to each other on opposing sides of the conveyor path and offset by the plate thickness in a superposition direction of the plate cutters, said cutting plates being aligned with the lengthwise direction thereof parallel with the lengthwise direction of the elongated sheet on the conveying path;

a reciprocating driver for reciprocating said upper mold and said lower mold in opposite directions to effect periodic engagement of said upper mold and said lower mold with said elongated sheet therebetween thereby forming a plurality of slits extending intermittently in the lengthwise direction of the elongated sheet in a zigzag arrangement;

expanding means for expanding the elongated sheet in a widthwise direction thereof so as to expand a widthwise dimension of the elongated sheet and open said slits thereby producing the expanded mesh sheet having a reticulated configuration; and rolling means for receiving and flattening said expanded mesh sheet.

2. The apparatus according to claim 1, wherein the plate thickness of successive individual ones of the plate cutters gradually increases toward sides of the upper mold and lower mold extending in the lengthwise direction of the plate cutters.

3. The apparatus according to claim 1, wherein ends of the blades at the recessed portions of the plate cutters are chamfered into the recessed portions.

4. The apparatus according to claim 1, wherein the upper mold and lower mold are absent the plate cutters at predetermined positions corresponding to a predetermined portion of the elongated sheet extending in the widthwise direction of the elongated sheet such that the elongated sheet has at least one solid portion devoid of slits extending in the lengthwise direction of the elongated sheet.

5. The apparatus according to claim 4, further comprising bending means for forming indentations in the at least one solid portion of the elongated sheet before the elongated sheet is flattened by said rolling means.

* * * * *